United States Patent [19]

Wilford

[11] Patent Number: 4,971,623

[45] Date of Patent: Nov. 20, 1990

[54] PROCESS FOR MAKING AS-CAST FERRITIC SPHEROIDAL GRAPHITIC DUCTILE IRON

[75] Inventor: Colin F. Wilford, Chester, England

[73] Assignee: The Electricity Council, London, England

[21] Appl. No.: 363,203

[22] Filed: Jun. 8, 1989

[51] Int. Cl.$^5$ ............................................. C22B 4/00
[52] U.S. Cl. ..................................... 75/10.60; 420/18
[58] Field of Search ........................ 75/44.5, 10.60; 420/18–25

[56] References Cited

U.S. PATENT DOCUMENTS

| | | | |
|---|---|---|---|
| 4,110,108 | 8/1978 | Geck | 75/445 |
| 4,415,362 | 11/1983 | Archenholtz | 420/18 |
| 4,579,164 | 4/1986 | Hartley | 420/18 |

*Primary Examiner*—Peter D. Rosenberg
*Attorney, Agent, or Firm*—Fuller, Ryan & Hohenfeldt

[57] ABSTRACT

A process for making ferritic spheroidal graphite iron uses no pig iron but instead melts medium manganese and low silicon content steel scrap in an electric furnace with about 3% by weight of low sulphur content graphite. When the melt reaches 1400° C. it is deslagged. Sufficient graphite is then added to bring the carbon up to at least 3% again and before or after this event, returns may be added to the melt while the furnace electric power is on to induce stirring of the melt. The melt is superheated next to above 1470° C. and carbon and silicon correction is made. This is followed by inoculating the melt and pouring the castings.

17 Claims, 2 Drawing Sheets

PROCESS FOR MAKING AS-CAST FERRITIC SPHEROIDAL GRAPHITIC DUCTILE IRON

BACKGROUND OF THE INVENTION

The invention disclosed herein pertains to a process for making a ferritic spheroidal graphite iron melt which is in condition for direct casting and does not require annealing for converting the carbon content of the melt to spheroidal graphite in ferrite as is sometimes done conventionally.

It is known that cast iron constituted primarily by a matrix of ferrite or pure iron in which there are isolated nodules or spheroids of pure graphite results in castings that are elastic, tough, ductile and resistant to fracture when sharply impacted. A method of producing ferritic spheroidal graphite iron that has been used for decades involves first making a cast iron melt and then pouring the molten metal into molds to make castings. At this point, as is known, some of the carbon will be chemically combined with iron as cementite, $Fe_3C$. This is extremely brittle and hard. To make the metal more ductile and malleable, it is annealed at temperatures in the range of 800° C. to 1000° C. (1470° F. to 1830° F.) which decomposes the iron carbide, leaving iron and isolated carbon nodules which have some degree of the desired sphericity.

By this historic process, annealing is done for hours and even days. Energy expenditure is high and, therefore, the cost of the malleable/ductile iron castings is high. The cost is also increased as the result of a fairly large number of castings having defects such as gas pockets. Malleable/ductile castings also warped so they had to be subjected to a costly straightening process.

More recently developed methods of making ductile spheroidal graphite iron castings require a high proportion of pig iron in combination with scrap steel. A good grade of pig iron is one that has low manganese, low tramp element and low sulphur content. Manganese promotes retention of carbon in the combined form of pearlite which is detrimental to formation of the ductile grades of spheroidal graphite. On the other hand, manganese has the beneficial effect of combining with sulphur to thereby prevent iron from combining with sulphur. Iron sulphide reduces ductility of iron. The best grades of ductile iron available today require a furnace charge that is low in sulphur and manganese and has controlled levels of silicon and carbon. In current practice, the furnace charge for a batch of ductile iron usually comprises scrap steel, pig iron and foundry returns. Returns are the pieces of metal such as sprues, gates, risers from the molds and scrap castings. Typically, practitioners of the best process developed up to the present time, use a ratio of pig iron to scrap steel in the furnace charge which is between 1:3 when using consistently high quality low manganese scrap and 3:1 when the steel is of uncertain origin. Low manganese (Mn) content pig iron contributes carbon to the melt and dilutes the manganese and because of the low sulphur content, reduces the amount of magnesium inoculant required to combine with sulphur before the melt is poured. Low manganese pig iron is available but is very expensive. A process that permits making as-cast ferritic spheroidal graphite iron which avoids using any pig iron and allows use of readily available steel scrap is recognized as being highly desirable.

The use of steel scrap of unknown analysis in known ductile iron melting processes creates problems to which attention must be given. Much of the available steel scrap consists of alloyed metals from the bodies and other parts of automobiles. The sheet metal used for automobile bodies in recent years is rolled out thinner than formerly to reduce the weight of automobiles. Reducing the thickness of the sheet metal cannot be done at the expense of strength. Hence, alloys are being used extensively to compensate for the loss of strength that would otherwise result from reducing thickness. Using more exotic alloys for automobile and other machinery parts has resulted in scrap steel containing higher Mn and other tramp elements which are detrimental to yielding spheroidal graphite in the ferritic condition which is associated with ductility. Foundry experts have found that the effects of undesirable alloy and impurity components such as chromium, titanium, phosphorus and other metals and an excess of manganese which is now found in much of the scrap steel, can be offset to a large extent by using substantial amounts of high grade low sulphur and low manganese content pig iron in the melt. The cost of this pig iron is exacerbated by reason of much of it having to be imported from either Canada, France, Brazil or the USSR. As a general rule, foundries increase the amount of pig iron in a melt in correspondence with increasing manganese in the steel scrap used in the melt because, as mentioned, manganese promotes pearlite and inhibits transformation of carbon to spheroidal graphite.

SUMMARY OF THE INVENTION

The new method provides for producing as-cast ferritic spheroidal graphite (F.S.G.) iron from a steel scrap charge which has its Mn content reduced during melting. This avoids depending on the availability of low Mn scrap and on low Mn pig iron as well since pig iron is used in the new process only when the Mn content of the steel scrap is very high and pig iron must be used to dilute Mn. The cost benefits of the new process which uses steel scrap only will be appreciated by anyone who compares the prices of steel scrap and pig iron.

With the new process, no further heat treatment of the castings is necessary to convert the carbon in the melt to spheroidal graphite.

An interesting feature of the new process is that, even though the Mn content of the cast product may be high compared to what experts have considered high when ductile nodular or spheroidal graphite iron is sought, the usual adverse effect of relatively high Mn is negated by the new process.

As will be discussed later, the method continues to allow using so-called "returns", which were defined earlier, in the melt for quick conversion to a melt of F.S.G. iron. In prior art methods, all metallics were melted without regard to the silicon content in the furnace.

An important feature of the new process is that the melt does not reach a temperature nor does it acquire a composition which would cause it to attack abnormally the refractory material which lines the melting furnace.

A more detailed description of the new process will now be set forth in reference to the accompanying drawings.

DESCRIPTION OF A PREFERRED EMBODIMENT

Figure 1:
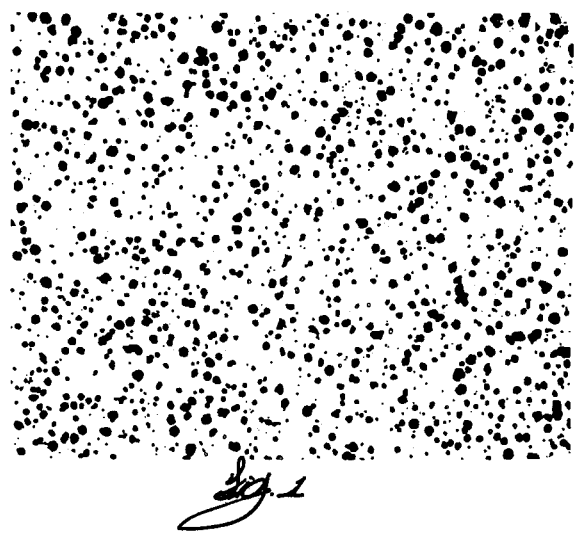
FIG. 1 is a photomicrograph of a sample of ferritic spheroidal graphite iron, magnified 40 times, and produced in accordance with the new process from a scrap steel furnace charge containing no pig iron.

A melt of ferritic spheroidal graphite iron, according to the new process, which is ready to cast is prepared preferably in an electric induction furnace. Previous melt down of the scrap steel used in any other type of furnace is unnecessary. An induction furnace that can be operated at power line frequency or double or triple power line frequency or medium frequency is acceptable. The materials required for initial melt down are steel scrap and graphite.

The steel scrap for the initial furnace charge must have low silicon and medium manganese content. Scrap steel high in tramp elements should be avoided to the extent possible. Moderate oxidation or rusting of the scrap is permissible. The graphite should be a premium grade having a sulphur content of below 0.1%. The manganese content of the steel scrap can be as high as 1.4% but a smaller amount is preferred.

For manganese to be reduced to acceptable levels, the initial scrap steel charge must have low silicon content and the carbon addition in the form of graphite must be optimized as will be discussed more fully later. Further, to avoid the resultant high manganese content slag from reacting with the silica lining of the furnace, the melt has to be thoroughly deslagged before the slag becomes aggressive.

The process is performed as follows:

1. Charge the electric furnace with steel scrap together with about 3.0% graphite by weight.
2. Begin melting in the ordinary manner.
3. As the steel charge melts and sinks down, add more steel and an additional at least about 3.0% of graphite by weight of the added steel.
4. Stop charging so as to leave sufficient space in the furnace for furnace returns, none of which should be added at this stage.
5. Obtain complete melting of the charge at the lowest temperature possible which is at about 1300° C. (2370° F.), the temperature at which the graphite carbon will go into solution.
6. When the steel and graphite melt have reached 1400° C. (2550° F.), thoroughly deslag the melt. Try to avoid exceeding 1400° C. at this time. It will be observed that deslagging is done when the amount of the melt is not the maximum which the furnace could hold if use of returns is contemplated. This contrasts with conventional practice wherein all contents of a batch are in the furnace before deslagging is undertaken.
7. Promptly after deslagging, test for carbon and add sufficient graphite to bring the melt up to the proper carbon content of at least 3% carbon and then charge the foundry returns, if any. This can be done in either order to suit the foundry's traditional practice. A beneficial technique, however, is to add the graphite with full electric power on and then gradually add the returns so as to maintain a surface stirring action. Returns can make up as much as 30%–40% of the melt by weight. The returns should never be melted down first as has been the conventional practice. According to the invention, high silicon content material such as returns should not be added until the melt is refined since silicon would otherwise oxidize before the Mn and other tramp elements which means the excess of Mn would not be carried off with the slag. Once high silicon containing material such as returns are in the melt, the manganese analysis cannot be changed so manganese content would likely be too high. Typical steel scrap is likely to contain 0.2% to 1.5% of manganese. Some prior art processes recommend the Mn content be 0.15% or lower to preserve high ductility of the cast metal. For reasons which are not fully understood, the new process results in casting metal which has higher tolerance for manganese without loss of ferrite quantity and without inhibition of spheroidal graphite formation. Final manganese content up to 0.4% is tolerable in some as-cast ferritic grades.
8. After the returns are melted, superheat the melt up to 1454° C. (2650° F.) to 1537° C. (2800° F.) in readiness for pouring. Deslag again and correct the metal analysis in the conventional way through the use of alloys such as ferro-silicon.
9. After deslagging inoculate the batch in the normal way with a magnesium containing inoculant such as commonly used cerium bearing magnesium ferro-silicon. As is known, the inoculant aids in uniform distribution of spheroidal graphite. After final inoculation, pour the melt into the molds.

Figure 2:
FIG. 2 is a photomicrograph of the same sample as in the preceding figure magnified 100 times.

The photomicrographs identified as FIGS. 1 and 2 illustrate the results which are obtained by using the new process just described. The metal product was made with steel scrap and graphite with no pig iron added to bring about the economic and metallurgical advantages of the new process. As can be seen in FIGS. 1 and 2 there is a high alpha iron or ferrite content present which is presented by the lighter background in which the darker spheroidal graphite particles are quite uniformly distributed. The wide distribution and high content of ferrite imparts the desirable property of high ductility and toughness to the metal which is characteristic of pure iron or ferrite.

Note especially in FIG. 2 that the majority of the graphite nodules are very near spherical which has been determined to be a desirable property insofar as ductility is concerned.

Figure 3:
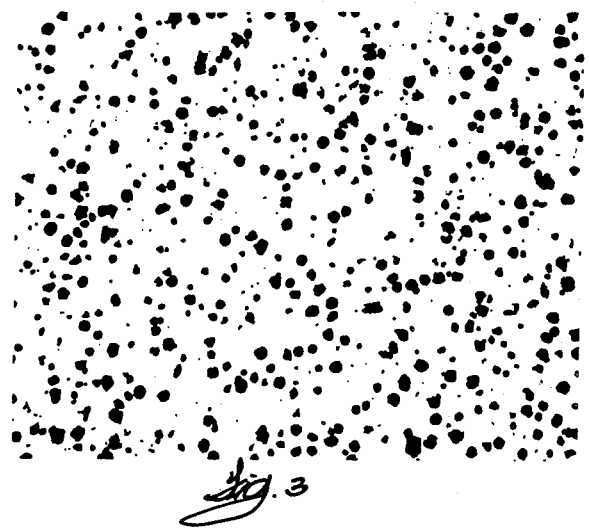
FIG. 3 is a photomicrograph of a sample of cast F.S.G. iron, magnified 40 times, produced from a pig iron and scrap steel furnace charge according to conventional practice.
Figure 4:
FIG. 4 is a photomicrograph of the same sample as in the preceding figure magnified 100 times.

The results obtained with a conventional F.S.G. iron making process are depicted in FIGS. 3 and 4. The furnace charge in this example was predominantly low manganese pig iron so as to produce the best result that can be obtained with the known process. No scrap metal was included in the furnace charge. By comparing the FIG. 3 photomicrograph of F.S.G. iron made by the prior art process with the FIG. 1 photo of F.S.G. iron made with the new high steel scrap content process, one may see that the new process results in a greater number of graphite spheroids being produced than does the old process. This is desirable. There is a higher percentage of ferrite present in the new process sample which means improved ductility.

Table I gives the constituents with which the furnace was charged for producing as-cast ferritic spheroidal graphite metal according to the new process which yielded the results demonstrated by the FIGS. 1 and 2 photomicrographs and for producing the metal according to the prior art process which yielded the results demonstrated by the FIGS. 3 and 4 photomicrographs.

TABLE I

| Constituent | FURNACE CHARGES | |
|---|---|---|
| | Prior Art Process | New Process |
| Returns | 30% | 30% |
| Pig Iron | 70% | 0.00% |
| Mn in Charge Constituents | 0.01% | 0.48% |
| Steel Scrap | 0.00% | 70% |
| Graphite | 0.00% | 3.7% (of the steel scrap) |

One advantage of the new process is that the charge which is comprised of steel scrap is much less expensive than the pig iron charge used in the old processes. Even though the high quality of graphite used in the new process is expensive, the total cost of producing a ton of F.S.G. iron under the new process is much lower than under the old process. The new process is more energy efficient since no heat treatment is required to obtain maximum ductility. The properties of the two batches as-cast are compared in Table II.

TABLE II

| Characteristic | CAST METAL | |
|---|---|---|
| | Prior Art Process FIGS. 3 & 4 | New Process FIGS. 1 & 2 |
| Carbon | 3.56% | 3.53% |
| Silicon | 2.50% | 2.46% |
| Nodule Count No./mm$^2$ | 115 | 205 |
| Ferrite Content | 66.4% | 82.3% |
| UTS N/mm$^2$ | 484 | 439 |
| Hardness HB | 156 | 140 |
| Manganese | .01% | .13% |
| Elongation | 15% | 25% |

UTS N/mm$^2$ stands for ultimate tensile strength in terms of Newtons per square millimeter.

Note in Table I that the materials charged into the furnace for performing the prior art process contained 0.01% manganese. Likewise, Table II shows that the manganese content was still 0.01% in he casting, showing that even though the charge contained only a small amount of manganese, none was removed by the prior art process. The 30% returns used in the prior art process batch were from a previous batch that used pig iron but no steel scrap. Seventy per cent (70%) of the batch was costly pig iron.

Note in Table I that the materials charged into the furnace for the new process batch included no pig iron. The manganese present in the steel scrap was 0.48%. Table II shows that the manganese content was reduced from 0.48% in the furnace charge to 0.13% in the metal as-cast, thus demonstrating the good capability of the new process to lower the Mn. In this example, 73% of the Mn was removed from the furnace charge. In the new process example the furnace was charged with 30% returns made from steel scrap. Experience has shown, however, that for the new process 10% to 60% of returns can be used.

Regardless of the type of electric furnace which is used to perform the process described above, the entire batch or melt would have to be poured before starting the next charge consisting of graphite and scrap steel if returns or anything containing silicon had been added to the preceding batch. Any appreciable silicon present in the residual of the preceding batch would inhibit removal of the manganese from the steel scrap by oxidation of the Mn. The silicon would oxidize preferentially. The main feature of the new process, which is to remove substantial amounts of Mn that is introduced to the melt by way of the steel scrap, would be defeated if silicon were present before the Mn is removed.

It is feasible to pour an entire batch and leave no heel or residual in the furnace if the electric furnaces used by a foundry are capable of initiating melting of steel scrap and graphite charged into an empty furnace. Induction furnaces that operate at two or three times the 50 Hz or 60 Hz power mains frequency can, for example, initiate melting even if the scrap is loosely packed in the furnace at the outset. In other words, the eddy currents induced by multiples of power mains frequencies are sufficient to heat the scrap up to the melting point.

Some foundries are equipped with induction furnaces which operate at power mains frequency such as 50 Hz or 60 Hz. Such furnaces cannot melt scrap steel even if it is compacted or baled because the induced eddy currents flowing in the individual pieces of scrap are too small to melt them. To circumvent this problem without sacrificing the novel feature of the process which is successful removal of Mn from the melt, some residual of molten metal is retained in the furnace after most of the metal has been poured. Then for the ensuing batch, the furnace can be charged with graphite and pieces of scrap steel or bales of scrap steel. When the first batch is made after the foundry has been shut down for a weekend, for example, there must be a solid slug or heel in the furnace of substantially silicon free metal. This would have been poured before shut down and must be put into the furnace at the beginning of the heat.

The heel or slug should contain 3 to 3.5% carbon and no silicon, for if it did, the Mn from the steel scrap would not oxidize. It should be apparent that returns which contain silicon should never be added to the furnace under consideration since this would enter silicon into the melt and the subsequent poured slug or residual molten metal. The first heel should be formed by charging the mains frequency furnace with heavy dense steel scrap and graphite.

A second electric furnace in the foundry would be devoted to melting returns plus low manganese pig iron or steel scrap if desired. The pig iron and scrap must have low Mn since this process does not reduce Mn. When both melts are at finished temperature, the majority of the melt from the first furnace using graphite and steel scrap from which Mn has been removed is added to the inherently low Mn metal taken from the second furnace to produce the foundry's base metal analysis in readiness for inoculation and then molding. The returns contain silicon now so, as has been explained, they can not be allowed to contaminate the first furnace whose function is to melt and remove manganese from steel scrap.

I claim:
1. A process for making ferritic spheroidal graphite iron including the steps of:
   charging an electric furnace with an initial amount of steel scrap and graphite, the graphite weight being about 3% of the weight of the scrap,
   with the electric power on causing the furnace to melt the graphite and steel scrap and when the melt has reached a temperature of not to exceed about 1400° C., turning off the furnace and deslagging the melt, adding sufficient graphite to bring the melt up to the required carbon content and adding an amount of ferro-silicon to reach the desired silicon content of the melt, superheating the melt to a temperature in the range of 1454° C. and 1537° C., deslagging again and correcting the metal analysis, and inoculating the metal from the furnace.

2. The process according to claim 1 wherein after said initial amounts of steel scrap and graphite have been melted, adding to the melt one or more quantities of steel scrap and for each quantity adding graphite again in the amount of 3% by weight of the added steel scrap, said adding of steel scrap and graphite being discontinued while there is still some unoccupied usable space remaining in the furnace, after said melt has reached not to exceed 1400° C. again, repeating the said deslagging and then adding in either order the returns and said sufficient graphite to bring the carbon to the required content.

3. The process according to any one of claims 1 or 2 wherein said process is carried out in an electric induction furnace.

4. The process according to any one of claims 1 or 2 wherein the melt in the furnace contains no pig iron.

5. The process according to claim 3 wherein the melt in the furnace contains no pig iron.

6. The process according to any one of claims 1 or 2 wherein the melt in the furnace contains sufficient pig iron to dilute the steel scrap to bring the percentage of manganese content down when the amount of manganese in the steel scrap is excessive.

7. The process according to claim 3 wherein the melt in the furnace contains sufficient pig iron to dilute the steel scrap to bring the percentage of manganese down when the amount of manganese in the steel scrap is excessive.

8. The process according to any one of claims 1 or 2 wherein said graphite has a sulphur content below 0.1%.

9. The process according to claim 1 wherein said inoculant is cerium bearing magnesium ferro-silicon.

10. The process according to claim 2 wherein said returns compose 10% to 60% of the melt in the furnace by weight.

11. The process according to claim 1 wherein manganese in the completed melt up to 0.4% by weight is permissible without interfering with spheroidal graphite formation.

12. A process for reducing manganese in a melt developed in an electric induction first furnace operating at power mains frequency to obtain as-cast low manganese content ferritic spheroidal graphite iron including the steps of:

containing in said first furnace a solid mass of substantially silicon free iron of such size as to draw enough electric power to melt the metal, charging said first furnace with additional amounts of graphite and manganese containing steel scrap, the weight of the graphite being no less than about 3% of the weight of the steel scrap, operating said first furnace with the electric power on to maintain said mass in a molten state, continuing to operate the first furnace to melt the graphite and steel scrap and when the melt has reached a temperature of not to exceed about 1400° C., turning off the first furnace and deslagging the melt.

13. The process according to claim 12 including adding sufficient graphite to bring the melt to the required carbon content, and superheating the melt to a temperature in the range of 1454° C. to 1537° C. and deslagging again.

14. The process according to claim 13 wherein after said melt is superheated a known amount is poured from the furnace to combine with a melt that has been produced in a separate furnace using as materials returns or a combination of steel scrap and low manganeses pig iron.

15. The process according to claim 14 wherein the silicon free molten mass remaining in the first furnace, after pouring a known amount of the melt therefrom, is adjusted to contain 3% to 3.5% of carbon by weight.

16. The process according to claim 12 wherein said mass of substantially silicon free iron contains 3% to 3.5% of carbon by weight.

17. The process according to claim 13 wherein after said melts are combined an inoculant is added to the mixture before pouring the metal.

* * * * *